United States Patent [19]

Funk et al.

[11] Patent Number: 4,731,175
[45] Date of Patent: Mar. 15, 1988

[54] PREHEAT CONTROL FOR A FRACTIONAL DISTILLATION PROCESS

[75] Inventors: Gary L. Funk; Terrence A. Davis; Bruce A. Jensen, all of Bartlesville, Okla.

[73] Assignee: Phillips Petroleum Company, Bartlesville, Okla.

[21] Appl. No.: 882,576

[22] Filed: Jul. 7, 1986

[51] Int. Cl.[4] .............................................. B01D 3/42
[52] U.S. Cl. ............................ 208/347; 208/DIG. 1; 208/160; 203/1; 202/160
[58] Field of Search ..................................... 203/1–13; 208/DIG. 11, 347, 350; 196/132; 202/160, 206

[56] References Cited

U.S. PATENT DOCUMENTS

| | | | |
|---|---|---|---|
| 2,580,651 | 1/1952 | Boyd, Jr. .......................... | 202/160 X |
| 3,309,287 | 3/1967 | Lupfer et al. ............................ | 203/1 |
| 3,361,646 | 1/1968 | MacMullan et al. ........... | 202/160 X |
| 3,428,527 | 2/1969 | Rijnsdorp et al. ....................... | 203/1 |
| 3,463,725 | 8/1969 | MacFarlane et al. ............... | 208/358 |
| 3,470,069 | 9/1969 | Bracken et al. .................. | 208/160 X |
| 4,007,112 | 2/1977 | Benker .................................. | 208/350 |
| 4,350,569 | 9/1982 | Furr .................................. | 208/DIG. 1 |
| 4,408,569 | 10/1983 | Novak .............................. | 122/448 R |
| 4,501,657 | 2/1985 | Nollkamper ............. | 208/DIG. 1 X |

OTHER PUBLICATIONS

Application Ser. No. 589,364—Filed Mar. 14, 1984—Hofferber.

Primary Examiner—Helen M. S. Sneed
Assistant Examiner—Glenn Caldarola
Attorney, Agent, or Firm—George E. Bogatie

[57] ABSTRACT

A computer control system for automatically optimizing the temperature of the feed supplied to a distillation column from a fuel fired preheat furnace, wherein the furnace temperature is manipulated in response to a measured ratio of distillate flow (D) from the tower to fuel flow (F) to the furnace. The D/F ratio is maximized by periodically comparing the present value of D/F to the previous value and incrementally increasing the furnace temperature as long as the D/F ratio increases. When no change is detected or the D/F ratio starts to decrease the furnace temperature is incrementally decreased until the D/F ratio again increases and reverses the control action once more.

12 Claims, 4 Drawing Figures

PREHEAT CONTROL FOR A FRACTIONAL DISTILLATION PROCESS

This invention relates to fractional distillation. In one aspect this invention relates to method and apparatus for minimizing heat supplied for preheating a crude oil feedstock.

In many processes for distilling crude oil, the temperature of the feed to the column is increased until a column operating constraint is encountered. While this tenchique insures that the maximum desired amount of distillate can be recovered, it produces a major cost for the step of preheating crude oil feed to the fractionator. This cost of the preheating step can be unnecessarily increased if the temperature of the feed is increased until an operating constraint is encountered because a substantial amount of fuel may be burned to supply heat to the crude feed which is unnecessary for fractional distillation.

For example, if the feed is an all liquid mixture, the temperature at which it first starts to boil is called the bubble point. If the feed is an all vapor mixture, the temperature at which it first starts to condense is called the dew point. A typical column is operated in a temperature range that is intermediate for the dew point and the bubble point since for effective separation it is important that both liquid and vapor phases exist throughout the column. Therefore, it is only necessary to vaporize the portion of the crude oil feed corresponding to the amount of distillate fractions that are to be recovered. If too much heat is supplied to preheat the crude oil, too much vapor is produced. The excess vapor must be condensed before it can be removed as residual. Therefore, as a result of overheating, energy is wasted in condensing the excess vapors. In addition, overheating can result in cracking of the feed and the resulting formation of undesired components. If insufficient heat is supplied to the crude oil, an insufficient amount of vapor is produced which results in certain components that are desired in the fractions being lost in the residual.

Consequently, it is an object of this invention to control preheating of the crude oil such that vaporization of the crude oil occurs only to the extent that the distillate is recovered. It is a further object of this invention to determine the temperature for the feed that produces an optimum ratio of distillate flow to fuel flow. It is a still further object of this invention to automatically set the preheat furnace temperature control at the point that provides the optimum distillate/fuel flow ratio. It is a still further object of this invention to manipulate the preheater furnace temperature in response to (1) the viscosity of the residue and (2) the distillate to fuel ratio.

In accordance with the present invention method and apparatus are provided for determining, on line, the ratio of total distillate flow (D) from a distillation column to the fuel flow (F) for a furnace which preheats feed to the column. Further, the D/F ratio signal can be utilized to directly manipulate furnace temperature or can be utilized to derive an intervening signal which can also control the extent that the feed to the column is preheated by manipulating furnace temperature. The intervening parameter selected would typically be a parameter such as residue viscosity for which product specifications could be maintained by including limits for a viscosity set point that is calculated on the basis of the D/F ratio signal.

In addition, the present invention provides a temperature optimizing routine which seeks an optimum temperature for the preheated feed. The optimization routine operates incrementally by comparing the present value of D/F to the previous value of D/F. As long as the difference between the present and previous values of D/F is a positive value, the temperature of the furnace effluent is stepwise increased. When the difference between the present and previous values of D/F is zero or reverses its algebraic sign, the temperature of the furnace is stepwise descreased until the difference in the present and previous value of the D/F ratio again becomes positive and thus reverses the control action once more.

In the preferred embodiment as illustrated in FIG. 2, the signal representative of the D/F ratio is converted to a signal representative of the viscosity of the residue by a non-linear function. The feed temperature optimizer then operates in the incremental manner previously described on the signal representative of the residue viscosity.

Other objects and advantages of the invention will be apparent from the foregoing brief description and the claims as well as from the drawings.

BRIEF DESCRIPTION OF THE DRAWINGS

The invention is illustrated and described in terms of a crude oil distillation column. However, the problem of optimizing the feed temperature so that the feed is vaporized only to the extent that distillate is recovered is broadly applicable to distillation operations in general, even though it is especially well suited to fractional distillation of crude oil. Therefore the invention is applicable to any fractional distillation process where the total amount of distillate withdrawn from a fractional distillation column is less than the corresponding amount of feed that would be vaporized by excessive preheating of the feed, for example, until an operating constraint is encountered. FIG. 3 illusrates the relations between the percent of feed vaporized and distillate flow where the invention can be advantageously applied.

For the sake of simplicity additional process equipment normally associated with a fractional distillation process such as pumps, additional heat exchangers and additional controllers are not illustrated since they play no direct part in the present invention.

Figure 1:
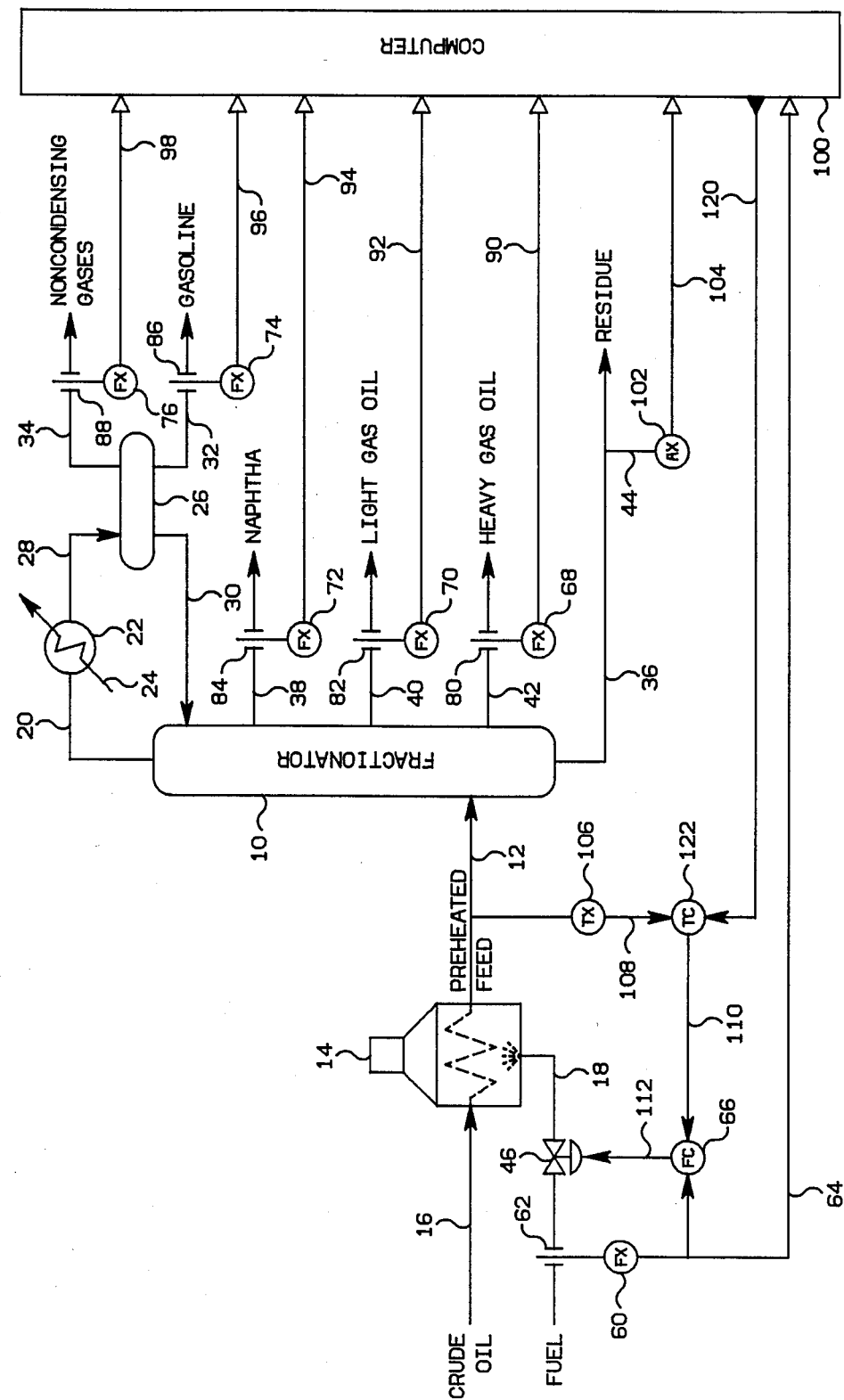
FIG. 1 is a diagrammatic illustration of a fractional distillation process with the associated control system of the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signal provided from flow sensors will generally be pneumatic in form.

Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in the control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combination of one or more such equipment types. While the presently preferred embodiment of the invention preferably utilizes a combination of pneumatic final control elements in conjunction with electrical analog signal handling and translation apparatus, the apparatus and method of the invention can be implemented using variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarly exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawing and in particular to FIG. 1, there is illustrated a fractional distillation column 10, which is utilized to fractionate a preheated crude oil feed into five distilled fractions. The preheated crude oil feed is provided to the fractional distillation column 10 from the furnace 14 through conduit means 12. A crude oil feed stream is provided to the furnace 14 through conduit means 16 and is withdrawn through conduit means 12 as the preheated feed to the fractional distillation column 10. Fuel is supplied to the furnace 14 through the conduit means 18 with combustion of the fuel being utilized to preheat the crude oil withdrawn through conduit means 12. For the crude tower to which the present invention was applied, the feed was heated to the point that the desired separation could be accomplished without supplying additional heat to the fluid in the lower portion of the fractional distillation column 10.

An overhead vapor stream is withdrawn from the upper portion of the fractional distillation column 10 through conduit means 20. The overhead vapor stream flowing through conduit means 20 is provided to the heat exchanger 22. The heat exchanger 22 is provided with a cooling medium through conduit means 24. Partially condensed fluid is provided from the heat exchanger 22 to the overhead accumulator 26 through conduit means 28. The first portion of the liquid in the overhead accumulator 26 is returned to the fractional distillation column 10 through conduit means 30 as an external overhead reflux, and a second portion is withdrawn as an overhead gasoline fraction through conduit means 32. Non-condensing gases are also withdrawn from accumulator 26 through conduit means 34 as a distillate fraction stream.

A stream containing naphtha fraction of the crude feed is withdrawn from the upper portion of the fractional distillation column 10 through conduit means 38. A light gas oil fraction is withdrawn from a central portion of the fractional distillation column 10 through conduit means 40, and a heavy gas oil fraction is withdrawn through conduit means 42.

The bottom stream containing residue is withdrawn from the fractional distillation column 10 through conduit means 36.

Control of the fractional distillation column 10 illustrated in FIG. 1 is achieved by providing a number of process measurements to a digital computer. In response to the process measurements the digital computer outputs a control signal which is utilized to manipulate the furnace temperature set point such that at optimum fractionator feed temperature is achieved for withdrawing the desired amount of liquid through conduit means 32, 34, 38, 40 and 42. The process measurements will first be described and then the use of the control signals will be described. Thereafter the generation of the control signals will be described.

Flow transducer 60 in combination with a flow sensor 62 which is operably located in conduit means 18 provides an output signal 64 which is representative of the actual flow rate of the furnace fuel flowing through conduit means 18. Signal 64 is provided from the transducer 60 as a process variable input to flow controller 66 and also as an input to the digital computer 100. In like manner flow transducer 68, 70, 72, 74 and 76 in combination respectively with flow sensor 80, 82, 84, 86 and 88 which are operably located respectively in conduit means 42, 40, 38, 32 and 34, provide output signals 90, 92, 94, 96 and 98 which are respectively representative of the actual flow rates of heavy gas oil in conduit means 42, light gas oil in conduit means 40, naphtha in conduit means 38, gasoline in conduit means 32, and non-condensed gases in conduit means 34. Signals 90, 92, 94, 96 and 96 are provided from their respective transducers as input to the computer 100.

Analyzer transducer 102 whish is a viscosity analyzer is in fluid communication with conduit means 36, via conduit means 44. Analyzer transducer 102 provides an output signal 104 which is representative of the viscosity of the fluid flowing in conduit means 36. Signal 104 is provided from analyzer transducer 102 to computer 100.

In response to the above described inputs computer 100 outputs a control signal 120 which is representative of an optimum temperature for the preheated feed flowing in conduit means 12. Signal 120 is provided from computer 100 as a set point signal to flow controller 122. Temperature transducer 106 in combination with a temperature sensor such as a thermocouple which is operably located in conduit means 12 provides as output signal 108 which is representative of the actual temperature of the fluid flowing in conduit means 12. Signal 108 is provided from the transducer 106 as the process variable input to temperature controller 122.

In response to signals 120 and 108, the temperature controller 122 provides an output signal 110 which is responsive to the difference between signals 108 and 120. Signal 110 is scaled so as to be representative of the flow rate of fuel to the furnace 14 required to maintain the actual temperature of the fluid flowing in conduit means 12 as represented by signal 108 substantially equal to the temperature represented by signal 120. Signal 110 is provided from the output of temperature controller 122 to the set point input of flow controller 66.

In response to signal 64 and 110 flow controller 66 provides an output signal 112 which is responsive to the difference between signals 64 and 110. Signal 112 is scaled to as to be representative of the position of control valve 46, which is operably located in conduit means 18, required to maintain the actual flow rate of fuel in conduit means 18 substantially equal to the flow rate represented by signal 110. Signal 112 is provided from the flow controller 66 as a control signal to valve 46, and the control valve 46 is manipulated in response thereto.

Figure 2:
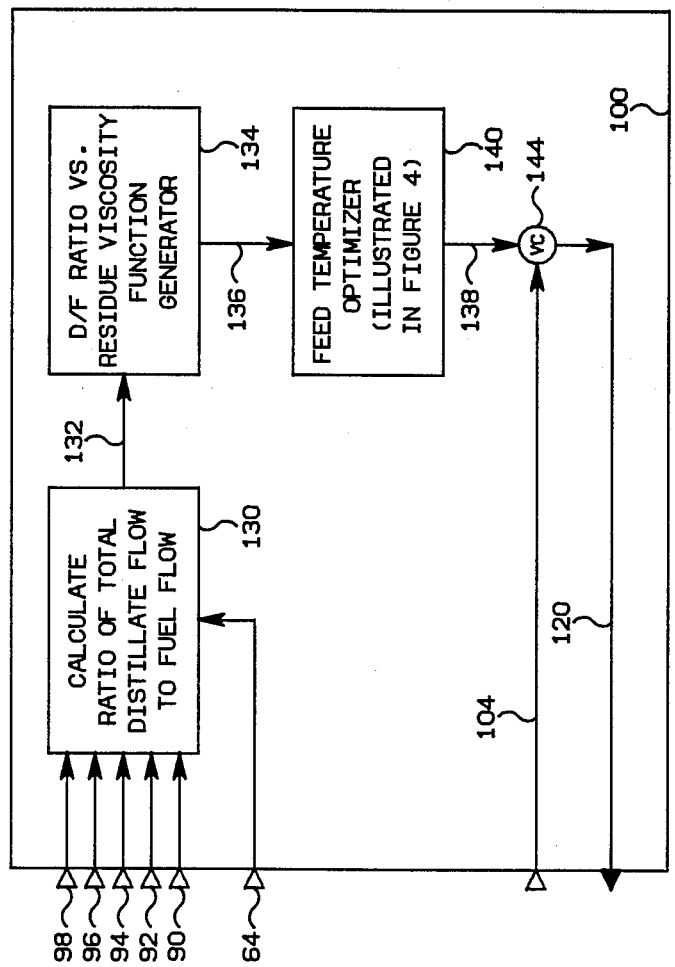
FIG. 2 is a flow diagram of the computer logic utilized to generate the set point for the furnace temperature.
Figure 3:
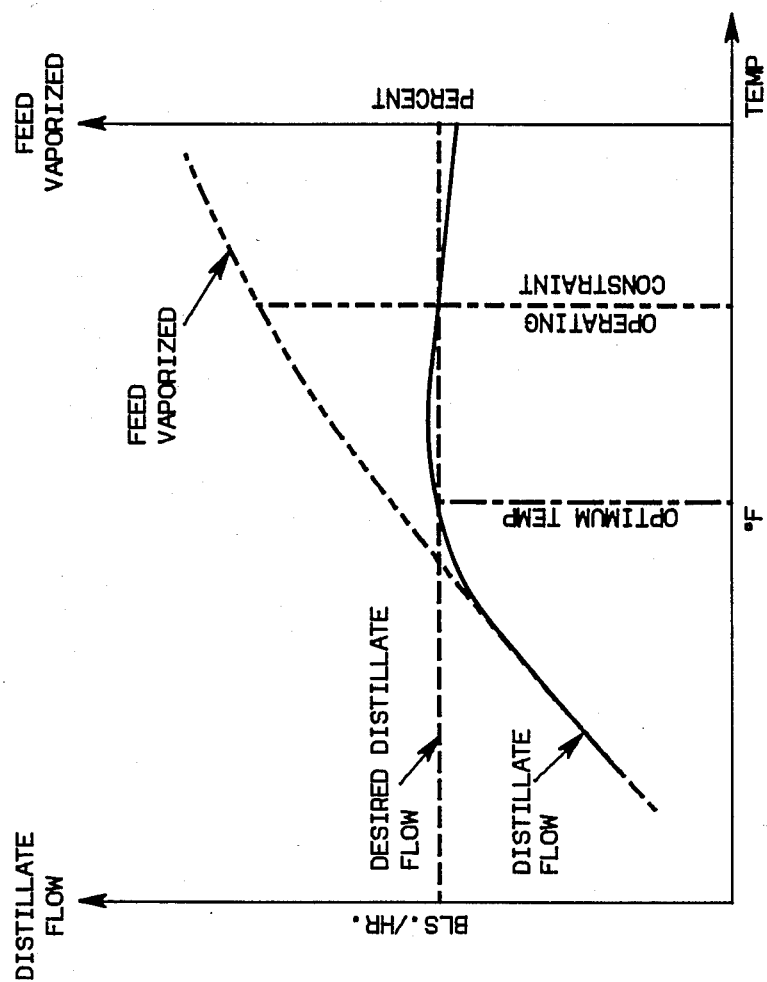
FIG. 3 is a generalized plot illustrating distillate flow and % of feed vaporized versus temperature for a typical fractional distillation process.

The computer flow diagram utilized to calculate the control signal 120 is illustrated in FIG. 2. Referring now to FIG. 2, signals 90, 92, 94, 96 and 98 which are representative of the flow rate of the distillate fraction streams flowing respectively in conduit means 42, 40, 38, 32 and 34 are provided as inputs to the computer block 130. Signal 64 which is representative of the fuel flowing in conduit means 18 to the furnace 14 is also provided as an input to computer block 130.

In response to the above described input computer block 130 calculates the ratio of the total distillate flow rate as represented by the sum of signals 90, 92, 94, 96, 98 to the fuel flow to the furnace 14 as represented by signal 64. Signal 132 which is representative of the of distillate of fuel ratio is provided from computer block 130 as an input to computer block 134.

The viscosity of the residue of the fluid flowing in conduit means 36 is calculated, based on the D/F ratio as represented by signal 132 in computer block 134. A function generator is provided to handle the conversion from the D/F ratio to residue viscosity. A generally linear relationship exists between the ratio and the residue viscosity. However, since viscosity is a property that can be continuously measured, a closer approximation than a straight line can be determined experimentally and utilized by the non-linear function generator to provide a closer estimate of the actual residue viscosity which is based on the D/F ratio signal. Signal 136 which is based on signal 132 is representative of the viscosity of the residue fluid flowing in conduit means 36. Signal 136 is provided from computer block 134 as an input to computer block 140 which is the feed temperature optimizer illustrated in FIG. 4. The computer block 140 provides output signal 138 which is representative of the residue viscosity which will provide an optimum temperature for the preheated feed flowing in conduit means 12. Signals utilized in FIG. 4 are as follows:

S.P. = updated value of signal 138.
VDF = signal 136
D/F = ratio of total distillate flow withdrawn from fractional distillation column 10 to the fuel flow supplied to furnace 14.
DELTA = change in viscosity that will provide a desired incremental change in furnace temperature.
$SP_{(LP)}$ = current value of signal 138 provided from the previous updating.

Figure 4:
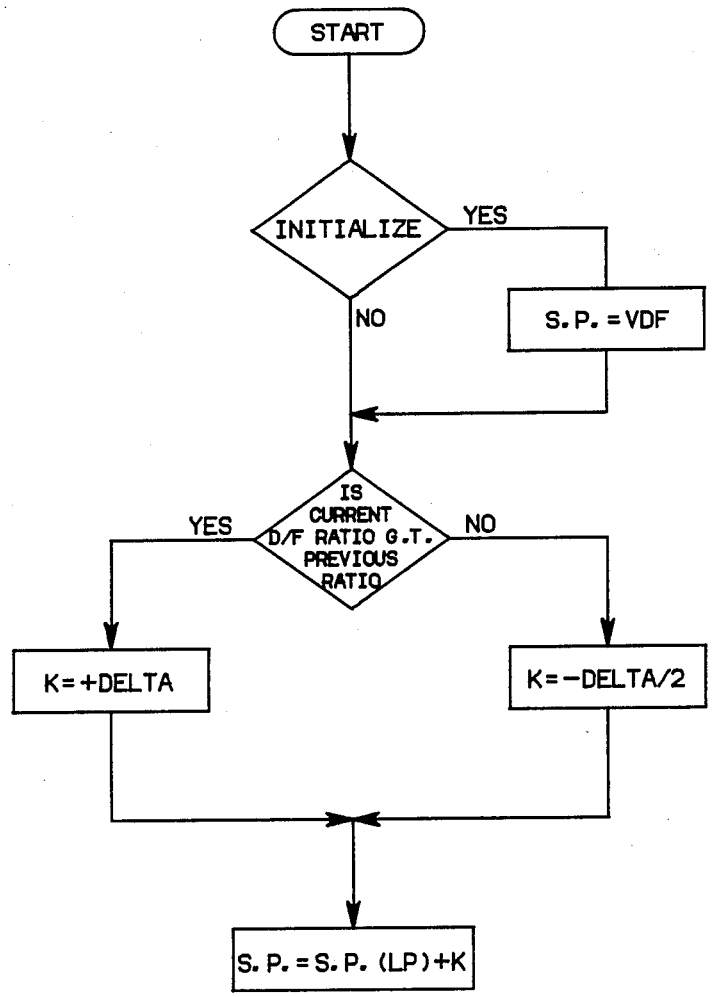
FIG. 4 is a logic flow diagram of a program which may be utilized to seek the optimum furnace temperature.

Referring now to FIG. 4 and assuming initializing of the system is not required, a determination is first made as to whether the actual D/F ratio is greater than the ratio determined in the previous execution of the feed temperature optimizer routine. If the D/F ratio has been increased, the logic illustrated in FIG. 4 increments the set point by a predetermined amount to further increase the D/F ratio by setting K = plus delta. If the present D/F ratio is not greater than the ratio determined in the previous execution of the optimizing routine, the logic illustrated decrements the set point to decrease the D/F ratio by setting K = minus delta/2. In this manner the optimizing routine seeks the optimum ratio by relying on feedback from actual process measurements of distillate flow and fuel flow.

Signal 138 is provided from computer block 140 as a set point input signal for viscosity controller 144. Signal 104 which, as previously stated, is representative of the actual viscosity of the fluid flowing in conduit means 36 is also provided to viscosity controller 144. In response to signals 138 and 104, the viscosity controller 144 provides an output signal 120 which is utilized as previously described.

The invention has been described in terms of a preferred embodiment as illustrated in FIGS. 1-4. Specific components used in the practice of the invention as illustrated in FIG. 1 such as flow sensors 62, 80, 82, 84, 86 and 88, flow transducers 60, 68, 70, 72, 74 and 76, flow controller 66, temperature controller 122, viscosity analyzer 102, and control valve 46 are each one a commercially available control components such as are described at length in *Perry's Chemical Engineering Handbook*, Fourth Edition, Chapter 22, McGraw-Hill.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a distillation column;
   a furnace for preheating feed to said distillation column;
   means for supplying fuel to said furnace wherein the combustion of said fuel supplies heat to said feed;
   means for introducing feed heated in said furnace into said distillation column;
   means for withdrawing at least one distillate stream from said distillation column, wherein each said distillate stream flows a fraction of said feed;
   means for establishing a first signal representative of the total distillate flow rate;
   means for establishing a second signal representative of the fuel flow rate to said furnace;
   means for establishing a third signal representative of the ratio of said first signal to said second signal;
   means for withdrawing a residue stream from the bottom of said distillation column;
   means for establishing a fourth signal representative of the viscosity of said residue based on the experimentally determined relationship of said viscosity to said third signal;
   means for establishing a fifth signal representative of the actual viscosity of said residue;
   means for establishing an initial value of a sixth signal representative of the desired viscosity of said residue, wherein said initial value of said sixth signal is responsive to said fourth signal;
   means for updating said sixth signal, wherein said sixth signal is incremented or decremented responsive to changes in said third signal;
   means for comparing said fifth signal and said sixth signal and for establishing a seventh signal responsive to the difference between said fifth signal and said sixth signal wherein said seventh signal is scaled so as to be representative of the temperature of said furnace required to maintain said fifth signal substantially equal to said sixth signal; and
   means for manipulating the temperature of said furnace in response to said seventh signal.

2. Apparatus in accordance with claim 1 wherein said means for manipulating the temperature of said furnace in response to said seventh signal comprises:
   means for establishing an eighth signal representative of the actual temperature of said furnace;
   means for comparing said seventh signal and said eighth signal and for establishing a ninth signal wherein said ninth signal is scaled so as to be representative of the fuel flow to said furnace required to maintain said eighth signal substantially equal to said seventh signal;
   means for establishing a tenth signal representative of the actual flow rate of fuel to said furnace;
   a control valve operably located so as to control the flow of fuel to said furnace;
   means for comparing said ninth signal and said tenth signal and for establishing an eleventh signal responsive to the difference between said ninth signal and said tenth signal wherein said eleventh signal is scaled so as to be representative of the position of said control valve required to maintain said tenth signal substantially equal to said ninth signal; and
   means for manipulating said control valve in response to said eleventh signal.

3. Apparatus in accordance with claim 1 wherein said means for establishing said initial value of said sixth signal comprises:
   means for equating said sixth signal to said fourth signal to establish said initial value of said sixth signal.

4. Apparatus in accordance with claim 1 wherein said means for updating said sixth signal comprises:
   means for storing a first value of said third signal during a first time period;
   means for establishing a second value of said third signal during a second time wherein said second time period is later in time than said first timer period; and
   means for comparing said first value and said second value of said third signal and for incrementing the value of said sixth signal based on the difference between said first value and said second value of said third signal to update said sixth signal.

5. Apparatus in accordance with claim 4 wherein said furnace temperature is stepwise increased if said second value of said third signal is greater than said first value.

6. Apparatus in accordance with claim 4 wherein said furnace temperature is stepwise decreased if said second value of said third signal is less than said first value.

7. A method for controlling a fractional distillation process wherein the feed, which is preheated in a fired furnace, is provided to a fractional distillation column and wherein at least one distillate stream is withdrawn from said fractional distillation column, said method comprising the steps of:
   establishing a first signal representative of the total distillate flow rate.
   establishing a second signal representative of the fuel flow rate to said furnace;
   establishing a third signal representative of the ratio of said first signal to said second signal;
   establishing a fourth signal representative of the viscosity of said residue based on the experimentally determined relationship of said viscosity to said third signal;
   establishing a fifth signal representative of the actual viscosity of said residue;
   establishing an initial value of a sixth signal representative of the desired viscosity of said residue, wherein said initial value of said sixth signal is responsive to said fourth signal;

updating said sixth signal, wherein said sixth signal is incremented or decremented responsive to changes in said third signal;

comparing said fifth signal and said sixth signal and establishing a seventh signal responsive to the difference between said fifth signal and said sixth signal wherein said seventh signal is scaled so as to be representative of the temperature of said furnace required to maintain said fifth signal substantially equal to said sixth signal; and manipulating the temperature of said furnace in response to said seventh signal.

8. A method in accordance with claim 7 wherein a control valve is operably located so as to control the flow of fuel to said furnace, and where said step of manipulating the temperature of said furnace in response to said seventh signal comprises:

establishing an eighth signal representative of the actual temperature of said furnace;

comparing said seventh signal and said eighth signal and for establishing a ninth signal wherein said ninth signal is scaled so as to be representative of fuel flow to said furnace required to maintain said eighth signal substantially equal to said seventh signal;

establishing a tenth signal representative of the actual flow rate of fuel to said furnace;

comparing said ninth signal and said tenth signal and for establishing an eleventh signal responsive to the difference between said ninth signal and said tenth signal wherein said eleventh signal is scaled so as to be representative of the position of said control valve required to maintain said tenth signal substantially equal to said ninth signal.

9. A method in accordance with claim 7 wherein said step of establishing said initial value of said sixth signal representative of the desired viscosity of said residue comprises equating said sixth signal to said fourth signal to establish said initial value of said sixth signal.

10. A method in accordance with claim 7 wherein an optimum temperature is established for said furnace by updating said sixth signal and wherein said step of updating said sixth signal comprises:

storing a first value of said third signal during a first time period;

establishing a second value of said third signal during a second time period wherein said second time period is later in time than said first time period; and comparing said first value and said second value of said third signal and for incrementing the value of said sixth signal based on the difference between said first value and said second value of said third signal to update said sixth signal.

11. A method in accordance with claim 10 wherein said furnace temperature is increased if said second value of said third signal is greater than said first value of said third signal.

12. A method in accordance with claim 10 wherein said furnace temperature is decreased if said second value of said third signal is less than said first value.

* * * * *